United States Patent [19]
Szu

[11] Patent Number: 5,952,957
[45] Date of Patent: Sep. 14, 1999

[54] WAVELET TRANSFORM OF SUPER-RESOLUTIONS BASED ON RADAR AND INFRARED SENSOR FUSION

[75] Inventor: Harold H. Szu, Bethesda, Md.

[73] Assignee: The United States of America as represented by the Secretary of the Navy, Washington, D.C.

[21] Appl. No.: 09/071,737

[22] Filed: May 1, 1998

[51] Int. Cl.[6] .................................................. G01S 13/89
[52] U.S. Cl. ............................................. 342/53; 342/179
[58] Field of Search .............................. 342/53, 176, 177, 342/179

[56] References Cited

U.S. PATENT DOCUMENTS

| | | | |
|---|---|---|---|
| 3,025,515 | 3/1962 | Fairbanks | 342/53 |
| 3,076,961 | 2/1963 | Bibbero | 342/53 |
| 3,380,028 | 4/1968 | Gustafson et al. | 342/53 |
| 4,716,414 | 12/1987 | Luttrell et al. | 342/179 |
| 5,117,238 | 5/1992 | Silverstein et al. | 342/373 |
| 5,353,233 | 10/1994 | Oian et al. | 364/485 |
| 5,561,431 | 10/1996 | Peele et al. | 342/90 |
| 5,619,998 | 4/1997 | Abdel-Malek et al. | 128/660.07 |

OTHER PUBLICATIONS

Chen CH, "Application of wavelet transforms to ultrasonic NDE and remote–sensing signal analysis", Proceedings of the IEEE–SP International Symposium on Time–Frequency and Time–Scale analysis (Cat No. 94th8007) pp. 472–475, Oct. 1994.

Li et al., "Muti–Sensor image fusion using the wavelet transform", Image Processing, Proceedings. ICIP–94., IEEE international conference, vol. 1, pp.51–55, 1994.

Entries in the Continuous Wavelet Transform Table of Joseph T. DeWitte, Jr. and Harold H. Szu, Ph.D. published in SPIE vol. 2762, pp. 144–150.

Sensor fusion for wide–area surveillance by Harold Szu and Joseph Garcia, published in SPIE vol. 2762. pp. 514–523.

*Primary Examiner*—Ian J. Lobo
*Attorney, Agent, or Firm*—James B. Bechtel, Esq.

[57] ABSTRACT

A method of enhancing resolution of an electromagnetic image comprising steps of inputting an infrared signal, inputting a radar signal, combining the infrared signal and the radar signal to produce an image and displaying the image.

17 Claims, 16 Drawing Sheets

CWT of sin(k0 x), k0=1
phi(x)=sin(sPi x) on [0,1]

Wavelet kernel in ab-space
phi(x)=1/sqrt(abs(a)) sin(2Pi y) u(y)
y=(x-b)/a, x=0, a in [-5,5], b in [-5,5]

WAVELET TRANSFORM OF SUPER-RESOLUTIONS BASED ON RADAR AND INFRARED SENSOR FUSION

BACKGROUND OF THE INVENTION

1. Field of the Invention

The present invention generally relates to super-resolution of noisy infrared imaging signals for the remote surveillance of objects such as vehicles or missiles through the fusion of radar and infrared technologies.

2. Description of the Related Art

Conventional infrared systems detect the naturally emitted or reflected electromagnetic radiation from objects (e.g., heat) with devices such as a charge-coupled device (CCD) array. However, conventional systems have good resolution only within a short range (e.g., a few kilometers) because devices such as CCD arrays have limited physical characteristics (e.g., a limited number of pixels) which restrict resolution at longer distances.

For example, an infrared image of a object which is close may be detected by a matrix of hundreds of pixels of a CCD array. To the contrary, an object which is at a great distance may only be detected by a few pixels. Such a distant object would appear as a small dot or blob on a monitor and its shape would not be large enough to be recognizable. For example, the Johnston criteria of minimum object size states that the smallest recognizable size occurs with a 3×6 array of 18 pixels. To overcome this problem algorithms were conventionally utilized to increase resolution.

Fourier Transform (FT) iterative algorithms were designed originally for electron microscope phase retrieval problems by Gerchberg and Saxton (e.g., see R. W. Gerchberg and W. O. Saxton, "A Practical Algorithm for the determination of phase from image and diffraction plane pictures," Optik Vol. 35, pp. 237–246, 1972 and W. O. Saxton, "Computer Techniques for Image Processing in Electron Microscopy" (Academic, New York, 1978)).

Subsequently, the Gerchberg and Saxton algorithm was extended to extrapolate signals and images successfully in ideal cases of weak or no noise (e.g., see J. R. Fienup, "Feature Issue on Signal Recovery," J. Opt. Soc. Am. Vol. 73, No. 11, pp. 1412–1526, November 1983; R. W. Gerchberg, "Super-resolution through error energy reduction," Opt. Acta Vol. 21, pp. 709–720, 1974; A. Papoulis, "A New Algorithm in Spectral Analysis and Band limited Extrapolation," IEEE Trans. Circuits Syst. CAS-22, p. 42, 1975; J. Cadzow, "An Extrapolation Procedure for Bandlimited Signals," IEEE Trans. Acoust. Speech Signal Process, ASSP-27, pp. 4–12, 1979; and J. L. Sanz and T. S. Huang, "Unified Hilbert Space Approach to Iterative Least-Squares Linear Signal Restoration," J. Opt. Soc. Am. Vol. 73, No. 11, pp. 1455–1465, November 1983.

However, when there is poor Signal-to-Noise Ratio (SNR), the performance of such a conventional system drastically deteriorates due to the ill-conditioned nature of such a noisy super-resolution. This makes real world applications impractical since a poor signal to noise ratio is common in real world applications.

SUMMARY OF THE INVENTION

It is, therefore, an object of the present invention to provide a structure and method for applying the forward and reverse Wavelet Transform (WT) of radar to the noisy super-resolution of infrared imaging on a focal plane array (FPA) for the remote surveillance of vehicles or missiles.

With the invention, the noisy super-resolution of infrared imaging is combined with the Wavelet transform for radar corner back-scattering size information. The Wavelet Transform limits the noise input and enhances the localized signal and when combined with the infrared imaging information produces much greater long distance infrared resolution.

More specifically, the invention includes a method of enhancing resolution of an electromagnetic image comprising steps of inputting an infrared signal, inputting a radar signal, transforming the infrared signal and the radar signal into a wavelet domain, combining the infrared signal and the radar signal to produce a combined wavelet signal, inverse transforming the combined wavelet signal to produce an image; and displaying the image.

The combining step comprises a step of extrapolating the infrared signal based on the radar signal. The inverse transforming step transforms the combined wavelet signal from the wavelet domain to a display domain.

The infrared signal is detected with a focal plane array comprising pixels, each of the pixels includes a sensing area and a non-sensing area surrounding the sensing area, wherein the combining step comprises a step of extrapolating the infrared signal from the sensing area toward the non-sensing area based on the radar signal. The step of extrapolating includes a step of adjusting the boundary between the infrared signal and the radar signal to provide a smooth transition between the sensing area and the non-sensing area.

The invention also comprises a processor, a radar unit for supplying a radar signal to the processor, an infrared unit for supplying an infrared signal to the processor; and a display device connected to the processor, wherein the processor transforms the infrared signal and the radar signal into a wavelet domain, combines the infrared signal and the radar signal to produce a combined wavelet signal, inverse transforms the combined wavelet signal to produce an image, and outputs the image to the display device.

The processor extrapolates the infrared signal based on the radar signal. When the processor inverse transforms the combined wavelet signal, the processor transforms the combined wavelet signal from the wavelet domain to a display domain.

The infrared unit comprises a focal plane array comprising pixels, each of the pixels includes a sensing area and a non-sensing area surrounding the sensing area, wherein the processor extrapolates the infrared signal from the sensing area toward the non-sensing area based on the radar signal. The processor adjusts the boundary between the infrared signal and the radar signal to provide a smooth transition between the sensing area and the non-sensing area.

The invention also comprises a system for detecting objects having at least one processor, at least one radar unit, each for supplying a radar signal to the at least one processor, at least one infrared unit, each for supplying an infrared signal to the at least one processor; and at least one display device connected to the at least one processor, wherein the at least one processor transforms the infrared signal and the radar signal into a wavelet domain combines the infrared signal and the radar signal to produce a combined wavelet signal, inverse transforms the combined wavelet signal to produce an image and outputs the image to the at least one display device.

The at least one processor extrapolates the infrared signal based on the radar signal. When the at least one processor inverse transforms the combined wavelet signal, the processor transforms the combined wavelet signal from the wavelet domain to a display domain.

Each of the at least one infrared unit comprises a focal plane array comprising pixels, each of the pixels including a sensing area and a non-sensing area surrounding the sensing area, wherein the at least one processor extrapolates the infrared signal from the sensing area toward the non-sensing area based on the radar signal. The at least one processor adjusts the boundary between the infrared signal and the radar signal to provide a smooth transition between the sensing area and the non-sensing area.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

As discussed above, conventional infrared systems have good resolution only within a short range (e.g., a few kilometers) because devices such as CCD arrays have limited physical characteristics (e.g., a limited number of pixels and an unusable "dead" area around each pixel) which restrict resolution at longer distances.

For example, an infrared image of a object which is close may be detected by an array of hundreds of pixels of a CCD array. To the contrary, an object which is at a great distance may only be detected by a few pixels. Such a distant object would appear as a small dot or blob on a monitor and its shape would not be recognizable. To overcome this problem algorithms were conventionally utilized to increase resolution. However, such algorithms are limited in the amount they increase resolution.

Radar systems include an emitter which broadcasts a signal having a certain frequency and wavelength, and a receiver which only looks for the signal broadcast by the emitter. Radar signals are generally reflected by the corners of objects which allows the size and shape of the object to be readily defined. This reflection is referred to as corner backscattering.

Since radar signals are reflected by the corners of objects, radar provides excellent size and shape information at long distances. However, radar does not provide the detailed information (e.g., the heat of the object distributed throughout its interior) which infrared imaging does.

The invention combines the long distance size and shape high resolution of radar with the detailed interior infrared information to produce an infrared visible image which has excellent resolution, even at great distances.

Figures 1, 2:
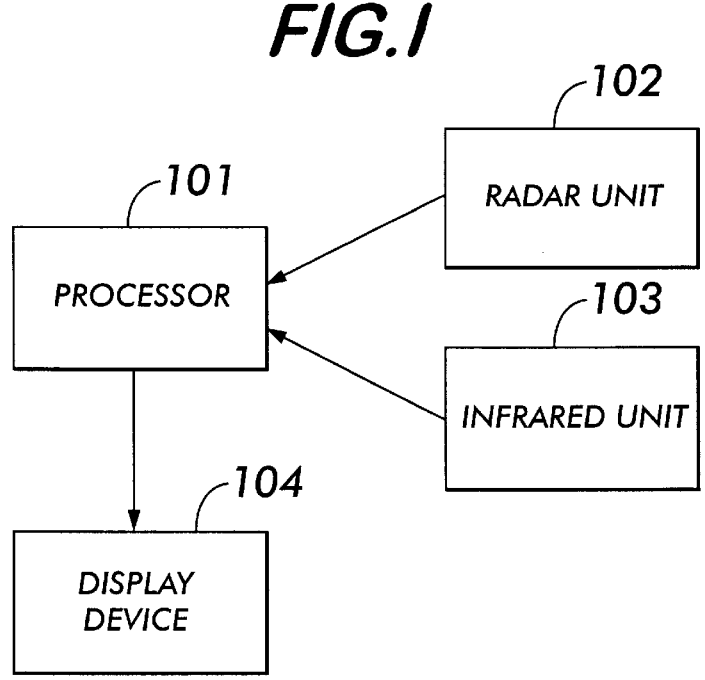
FIG. 1 is a schematic diagram of a hardware embodiment of the invention.
FIG. 2 is a representation of point-like object over the horizon.

Referring now to the drawings, and more particularly to FIG. 1, the basic hardware of the invention is illustrated. More specifically, the invention includes a processor 101 which receives input from a radar unit 102 and an infrared unit 103. The processor 101 analyzes the input from the radar unit 102 and the infrared unit 103, as explained in greater detail below, and outputs a high resolution image on a display device 104.

The invention is fundamentally different than conventional approaches because the invention utilizes the Wavelet Transform version of the Gerchberg and Saxton (GS) algorithm for combining radar size as a priori information used by the GS algorithm to the band-limited infrared sensor data. The invention extrapolates and increases the infrared resolution and introduces an improved signal-to-noise algorithm for use with such a combined system.

Wavelet Transform Approach

The invention utilizes the Gerchberg and Saxton algorithm from the Wavelet Transform (WT) viewpoint. The Wavelet Transform is a Fourier Transform generalized for noisy wideband transients analysis (e.g., see H. Szu, Y. Sheng, J. Chen, "Wavelet Transform as a bank of the matched filters," Applied Opt. Vol. 31, pp. 3267–3277, June 1992).

The Wavelet Transform is more powerful than the Fourier Transform in handling a localized and non-periodical signal because of its intrinsic SNR enhancement capability (e.g., see IEEE Trans. Info. Theo. 1992 Special Issue; Optical Engineering Sept. 1992 Special Issue; and Optical Engineering July 1994 Special Issue). This increase in power handling capability of the Wavelet Transform is partly due to the mismatch of the tradition Fourier Transform with real world localized signals and images.

Since white noise is, by definition, present globally in every Fourier mode, the global Fourier Transform tends to pick up less frequency-localized signals than noise. Therefore, with the present invention, it is desirable to generalize the Fourier Transform for nonperiodic and local signals and images. For example, the earth emits many periodic and quasi-periodic background clusters, while a man-made signal appears only once and does not repeat itself.

The Wavelet Transform is in fact a generalization of the Fourier Transform and is defined, similar to the Fourier Transform, as the inner product in the Hilbert space between the signal f(x) and its bases. The Hilbert space is an infinite dimension generalization of the linear vector dimension of three dimensions (e.g., x, y and z) in which objects sit, as there are much more frequency mode dimensions approaching infinity. Introduced by A. Haar in 1910 and subsequently by Morlet, Grossman, Meyer, and Daubechies in the 1980's the line by line comparison between Wavelet Transform and Fourier Transform are given as follows:

$$F(a,b)=(f(x),g_{ab}(x));\ F(k)=(f(x),e_k(x)) \quad (1a,b)$$

$$g_{ab}(x)=g((x-b)/a);\ e_k(x)=exp(ikx) \quad (2a,b)$$

The left-hand side basis, $g_{ab}(x)$ defined in Eq(2ia), denotes all daughter wavelets generated as the dilated and shifted copies of the mother wavelet g(x), while the right-hand side is analogously the Fourier Transform written in the inner product bracket shorthand notation. The subscript a is the wavelength where 1/a is equivalent to the Fourier wave number k, and b is the coordinate shift necessary for a local mother wavelet to span the whole real line x.

For an arbitrary admissible mother wavelet (e.g., see H. Szu, Y. Sheng, J. Chen, "Wavelet Transform as a bank of the matched filters," Applied Opt. Vol. 31, pp. 3267–3277, June 1992), the Wavelet Transform can be implemented using FFT, the Fast Fourier Transform. The fast Fourier Transform algorithm presented by Tukey and Cooly is based on the symmetry (e.g., cos 60°=sin 30°), where no new computation is necessary once cos 60° is computed. The shift of the inner product Eq. (1a) makes the Wavelet Transform appear as a correlation product denoted by $^{(*)}$ which, according to the Fourier deconvolution theorem, can be integrated as follows:

$$F(a,b)=g(x/a)^{(*)}f(x)|_{x-b/a}=FT^{-1}[FT\{g(x/a)\}*FT\{f(x)\}]|_{x-b/a}$$

where the superscript * denotes the complex conjugation.

For example, a special admissible mother wavelet has a gaussian window weighted of the Fourier sinusoidal basis $e_k(x)$, Eq(2b). Other invertible Wavelet Transforms are given in "Entries in the Continuous Wavelet Transform Table" J. DeWitte and H. Szu, SPIE Vol. 2762, pp. 144–151, 1996.

$$g(x)=exp(ik_ox)exp(-x^2/2);\ G(k)=exp(-(k-k_o)^2) \quad (3)$$

Eq. (3) is known also as the Morlet Wavelet Transform (WT), which may be considered as a windowed Fourier Transform. Sometime a local transient signal at a fixed scale resolution, e.g., the Gabor elementary signal itself, matches better with such a Morlet wavelet, $g_{ab}(x)$, than with the global and periodic sinusoidal wave, $e_k(x)$. This is the reason why the Wavelet Transform was rediscovered for the oil exploration seismic imaging applications in the last decades.

One major computational complexity of employing the wavelet transform is the inverse wavelet transform, which is given in Equation 6 of the DeWitte and Szu article which is reproduced here:

$$f(x) = \frac{1}{C_\psi} \int_{-\infty}^{+\infty} db \int_{-\infty}^{+\infty} \frac{da}{a^2} [W\psi \int] (a,b) \frac{1}{\sqrt{|a|}} \psi\left(\frac{x-b}{a}\right)$$

$$C\psi = \int_{-\infty}^{+\infty} dk \frac{|[\mathfrak{I}\psi](k)|^2}{|k|}$$

More specifically, the inverse wavelet transform involves a double integration over the wavelet scale parameter a, and shift parameter b, which is necessary for a localized basis, as opposed to a Fourier single inverse integral.

To the contrary, the present inventor has applied, as opposed to Gaussian window which is illustrated in Equation 3, above, a rectangle window where u(x)=1, $0 \leq x \leq 1$, and is otherwise 0. Therefore, any sinusoidal plane wave incident on the focal plane array can be exactly inverted, as is discussed in the article "Entries in the Continuous Wavelet Transform Table" J. DeWitte and H. Szu, SPIE Vol. 2762, pp. 144–151, 1996. For reference, Equation 10 from the DeWitte article is also reproduced below:

$$f(x) = \frac{e^{\pm ik_0 x}}{C_\psi} \int_{-\infty}^{+\infty} da \frac{1}{|a|} \left[\frac{\sin(ak_0/2 \pm \mp \pi)}{ak_0/2 \pm \mp \pi}\right]^2$$

$$= \frac{e^{\pm ik_0 x}}{C_\psi} \int_{-\infty}^{+\infty} da \frac{1}{|k|} \left[\frac{\sin(k/2 \pm \mp \pi)}{k/2 \pm \mp \pi}\right]^2$$

$$= \frac{e^{\pm ik_0 x}}{C_\psi} \int_{-\infty}^{+\infty} da \frac{1}{|k|} \left[\frac{\sin(k/2 - \pi)}{k/2 - \pi}\right]^2$$

Figure 17:
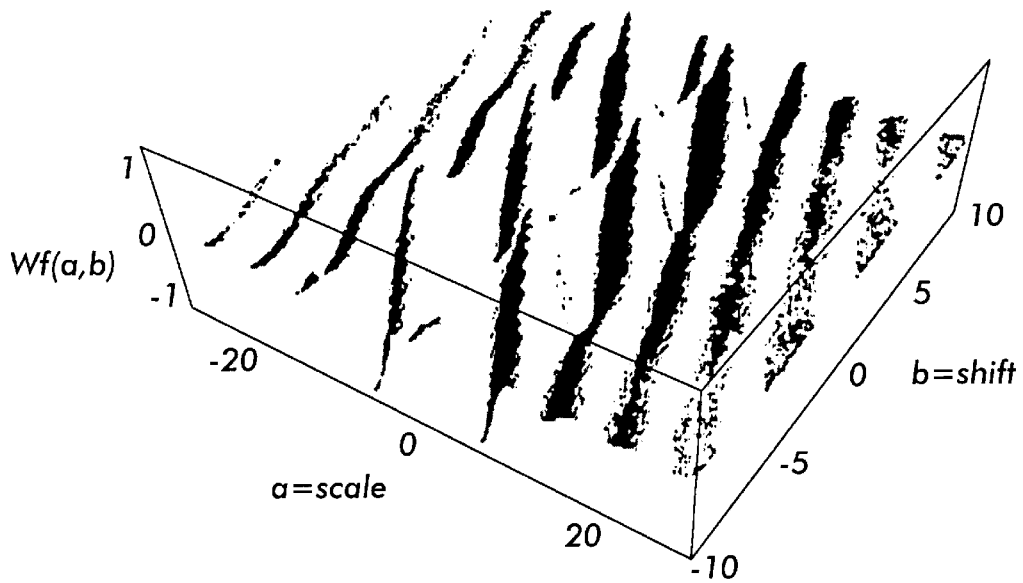
FIG. 17 is a representation of a continuous wavelet transform.
Figure 18:
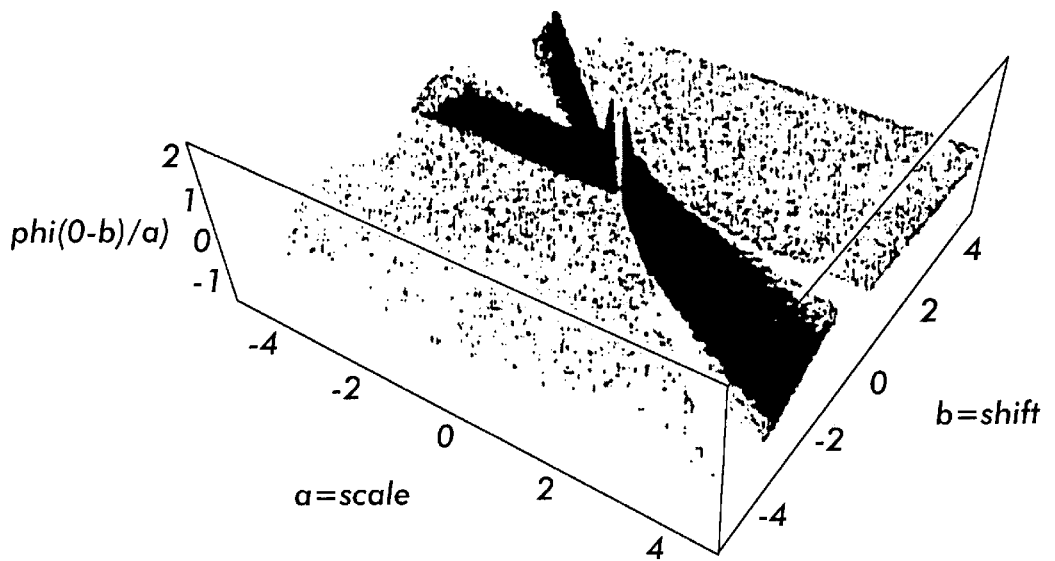
FIG. 18 is a representation of a local sine wavelet transform kernel.

Further, FIGS. 1 and 2 of the DeWitte and Szu article are shown as FIGS. 17 and 18 of the present application. FIG. 17 illustrates the continuous wavelet transform $[W_{\psi_1}f_1]$(a, b), of an infinite sinusoidal using a single-cycle sinusoid as the wavelet transform kernel: $f_1(x)=\sin(k_0x)$ and $\psi_1(x)=\sin(2\pi x)u(x)$. The parameter $k_0$ is 1 in this example. The parameter u(x) is the unit rectangle function of height 1 for $x \in [0,1]$ and zero everywhere else.

With respect to FIG. 18, the local sine wavelet transform kernel $$1/\sqrt{|a|}\ \psi_1((x-b)/a)$$

interpreted as a function of a and b for fixed. The unit scale and zero shift kernel is reproduced along the line a=-1. Note how the functions dies out in any direction away from the orchard. With the inventive analytical invertible kernel, a better choice of noise suppression and general design study is provided when compared to the Morlet Wavelet.

Noisy Super-resolution

The invention applies the Wavelet Transform-Gerchberg and Saxton algorithm to remote sensing for surveillance from poor signals, such as those signals for imaging a remote object having, at best, a few noisy pixel resolution. This poor resolution could be due, for example, to the hardware imaging device. In case of imaging for remote surveillance, it is common to obtain only a single dot of a few pixels on the focal plane array (FPA).

The mid-infrared wavelength range (e.g., 3 to 5 microns) is preferred for detecting the chemical burning exhaust from a vehicle or missile (e.g., see H. Szu, "Infrared Power Spectral Density Diurnal Variations and Clutter Rejection Scaling Laws for Focal Plane Arrays," SPIE Proceedings Vol. 638 (Hybrid Image Processing), pp. 148–165, 1986).

According to the well known far-field coherence theorem of Van Citter-Zernike, (e.g., see H. Szu, "Infrared Power Spectral Density Diurnal Variations and Clutter Rejection Scaling Laws for Focal Plane Arrays," SPIE Proceedings Vol. 638 (Hybrid Image Processing), pp. 148–165, 1986), only the plane wave that is in phase (relative to the lens aperture) will survive a long distance propagation and thus will be imaged at the focal length on the focal plane array that is equivalent to the Fourier transform of the object (e.g., see J Goodman, "Fourier Optics").

For example, if the two-dimensional shape of a plume could be approximated by a triangle object having a unit length, then the associated Fourier spectrum on the focal plane array of infinite precision would be given by Eq. (4).

$$F(k)=FT\{\text{triangle}(x)\}=FT\{\text{rect}(x)*\text{rect}(x)\}=\text{Sinc}(k)^2 \qquad (4)$$

where the convolution product of rect(x) with itself gives rect(x) * rect(x)=triangle(x), and FT {rect(x)}=Sinc(k), and thus the Fourier deconvolution theorem gives the result.

Each pixel on focal plane array has a unit geometric area defining a single pixel, which is bigger than the physical sensing area within the pixel defined by Rect(k) in the focal plane array. This size difference is due to dead filler space (e.g., a non-sensing area) for charge coupling device (CCD) separation and other electron circuitry reasons. Such filler space can occupy about 50% of the area outside the sensing area of each pixel.

Furthermore, it is assumed that an advanced back plane technology is on the horizon. For example, a high-temperature superconductor balometer is being developed that is capable of giving a spatially resolved amplitude distribution where a direct read out (point-by-point) within the single physical active sensing areas would be possible (e.g, see H. Szu, "High Temperature Superconductor Neurocomputers," Neurocomputing, Elsevier, Vol. 5, 1993; U.S. Pat. No. 1993).

Therefore, a noisy dot image will have a positive photon noise distributed according to a Poisson distribution on such a focal plane array. Thus, the present invention is directed to a sub-pixel super-resolution which has a noisy band-limited F(k)' root mean square SNR=1

$$F(k)'=\text{Rect}(k)F(k)+N(k); \qquad (5)$$

where an ideal source F(k) is given by Eq. (4), and N(k) is a positive photon noise generated by the Poisson distribution N(k) approximated by: −log (uniform noise, e.g., see J. Goodman, "Fourier Optics").

On the other hand, radar has a longer wavelength than the single digit micron wavelengths of infrared systems. Therefore, radar is more robust to adverse weather condition than infrared sensors (e.g., when going around rain drops or through fog scatters). Both radar and infrared systems are used to track moving objects in surveillance. Relatively speaking, the radar processing gives a better estimation of target size information because of enhanced electromagnetic corner backscattering.

The present invention utilizes the Wavelet Transform version of the Gerchberg and Saxton algorithm for combining radar size information to the band-limited infrared sensor data.

Improved Algorithm

Thus, to overcome the limitations of focal plane array hardware, the invention utilizes a invertible continuous wavelet transform. For example, such an invertible continuous wavelet transform is a Morlet Wavelet Transform, which is a multiple resolution version of the short-time windowed Fourier Transform of the Gabor Wavelet Transform and is capable of incorporating both Fourier frequency domain infrared input information and object spatial domain radar size information. However, the invention is not limited only to the Morlet Wavlet Transforms and is useful with all invertible continuous wavelet transforms. Some invertible wavelet transforms are given in J. DeWitte and H. Szu, "Proc. SPEC 2762", pp. 144–151, 1996 "Entries in the Continuous Wavelet Transform Table".

The invention extrapolates the exceedingly noisy infrared data obtained from the active sensing area within a single pixel toward the dead filler space surrounding the sensing area. In this sense, the invention achieves superresolution by extrapolating the low pass of physical pixel input in order to gain the high frequency information derived from the radar size information.

The invention is fundamentally different than conventional teachings because the invention inputs the infrared and radar signals, transforms the signals to the wavelet domain, combines the infrared and radar signals in the wavelet domain and then inverse transforms the combined wavelet domain signal into the image domain so that signal can be displayed. No conventional structure or method performs such forward and backward wavelength transform for superresolution.

The Gerchberg and Saxton algorithm which combines both domains (e.g., radar and infrared) is mathematically equivalent to the Papoulis-Gerchberg iterative algorithm which is implemented in the spatial frequency domain only.

Figure 16:
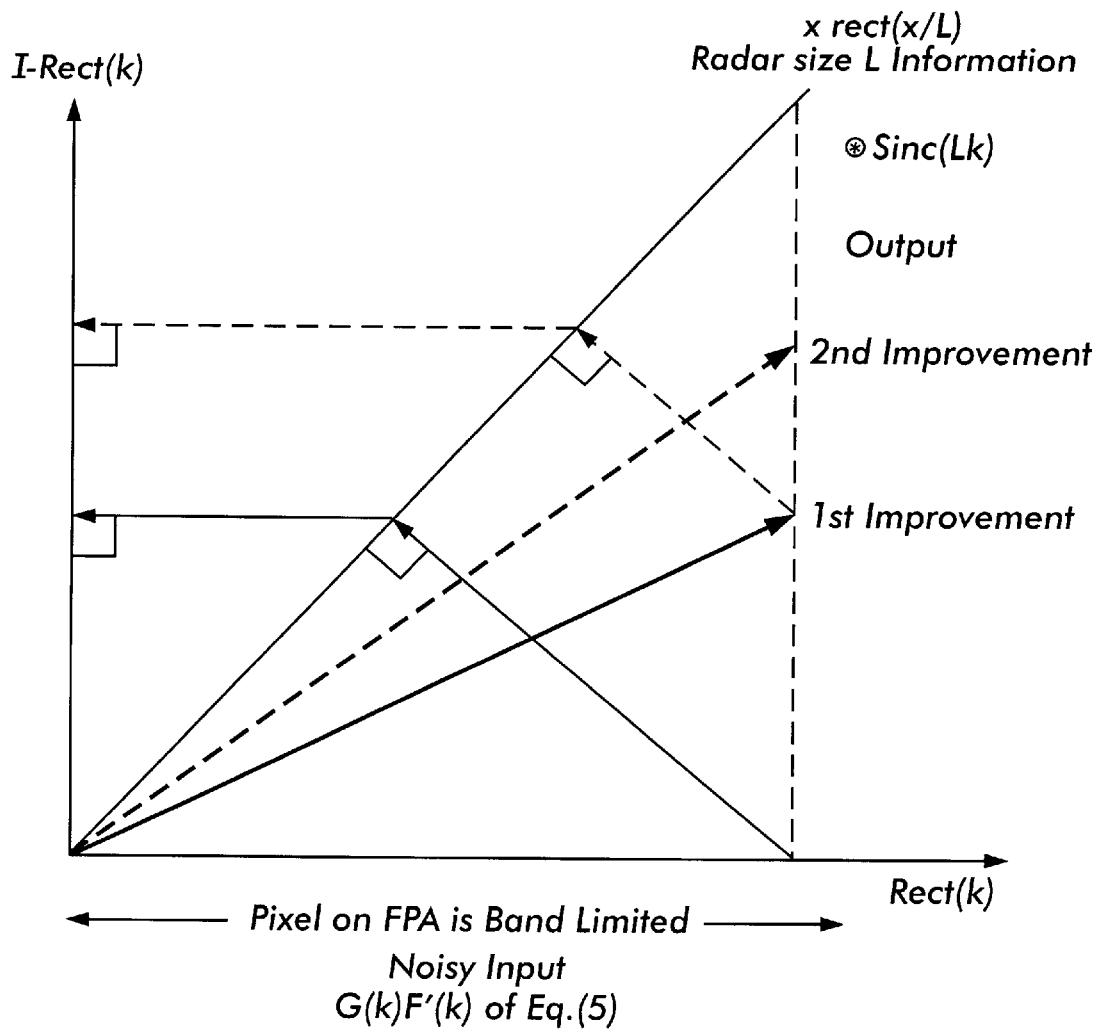
FIG. 16 is a graph showing convergence of noisy super-resolution.

The present invention goes beyond such conventional teaching. For example, the present invention is useful for proving convergence, which is illustrated in FIG. 16.

The present invention overcomes the computational complexity of the size constraint of radar, which would be implemented by using rect(x/L)g(x)f'(x) at the object domain, to form the equivalent of the convolution product Sinc(Lk)*G(k)*F'(k) in the frequency domain and carried the complete computation in the focal plane arrays frequency domain only.

Thus, an electron chip combined with a high resolution detector array at the back plane, namely the Fourier k-plane, can numerically incorporate (i) the gaussian window G(k) over the dot image, (ii) the infrared data denoted as Input(k), and (iii) the radar size data as Sinc(Lk) in the following modified algorithm:

$$G(k)F_o(k)=0 \qquad (6)$$

$$G(k)F_m(k)=G(k)*\text{Sinc}(k)*\{\text{Rect}(k)\text{Input}_{m-1}(k)+[I-\text{Rect}(k)]G(k)F_{m-1}(k)\} \qquad (7)$$

where I denotes the identity operator, and [I−Rect] covers the whole real frequency line outside the pixel, and the iteration subscript m is greater than and equal to one. Furthermore, the invention introduces a combined total input as a weighted infrared data with radar data $$\text{Input}_{m-1}(k)=[\text{percent } G(k)F'(k)+(1-\text{percent})G(k)F_{m-1}(k))] \qquad (8)$$

where the weight, percent ranged between [1,0], indicates how much the original noisy infrared input, G(k)F'(k) Eq. (5), shall be kept versus that of radar size input. Eq. (8) provides a smoother transition at the boundary of the Rect truncation giving smooth reconstruction of the triangle plume shape. This linear combination between two sensors' measurement allows smoothness and a better fit at the boundaries frequency cutoff rect(k). For example, for percent=0.5, and SNR=1.3, after ten iterations, the Inverse Transform $FT^{-1}\{GF\}$ gives almost the ideal triangle shape function. Moreover, the improvement of SNR=1.5 within the central pixel was observed.

The convergence can be understood in terms of Projection Operator Rect as the abscissa and it compliment (I−Rect) as the coordinate because rect(I−rect)=0 gives orthogonal axes. The constraint G*Sinc is along the first quadrant closer to the abscissa because of the Gaussian tapering of rect(x) resembling to the input data and, therefore, in the Hilbert space, closer to the input abscissa.

Figure 3:
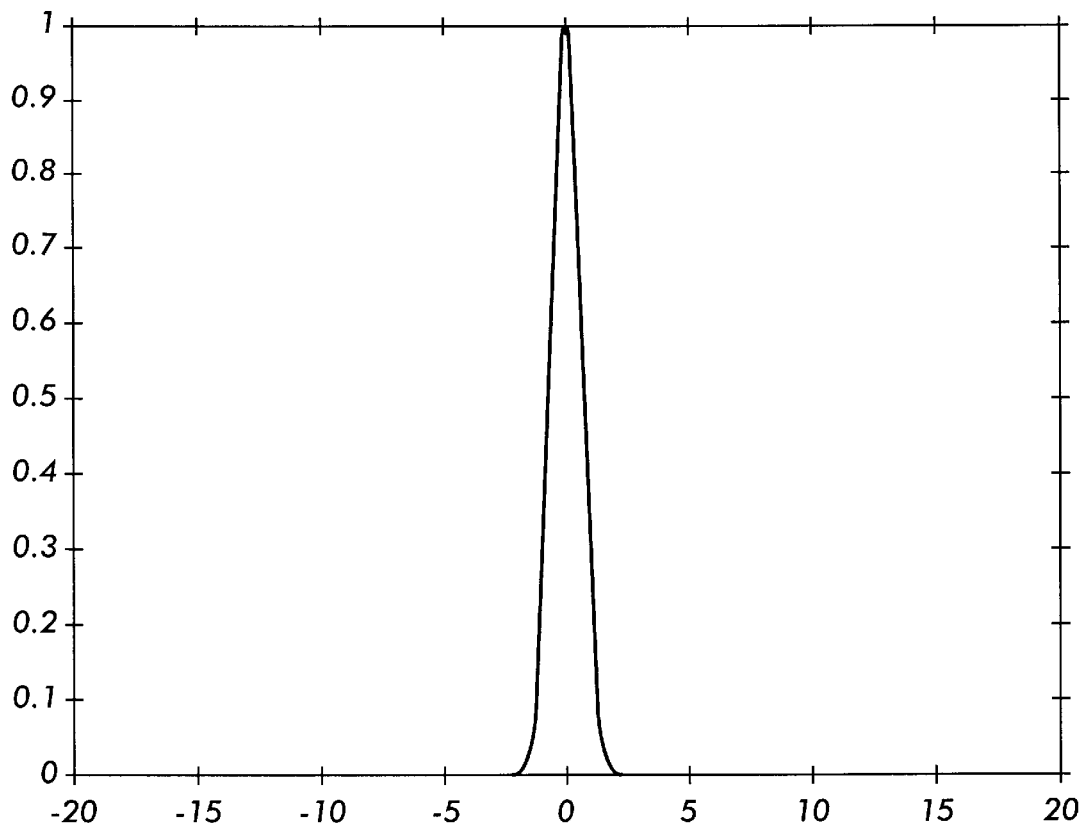
FIG. 3 is a graph of a focal plane array lens point spread function.
Figure 4:
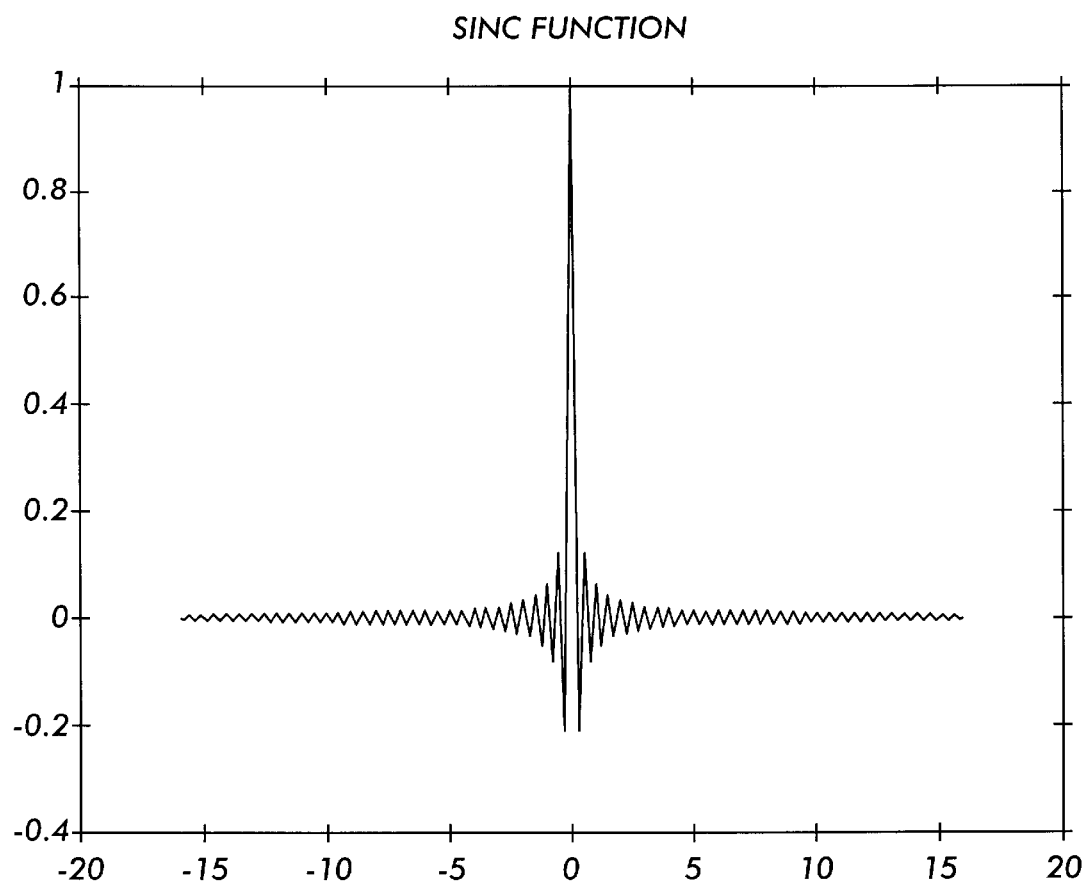
FIG. 4 is a graph of radar-generated size information.
Figure 5:
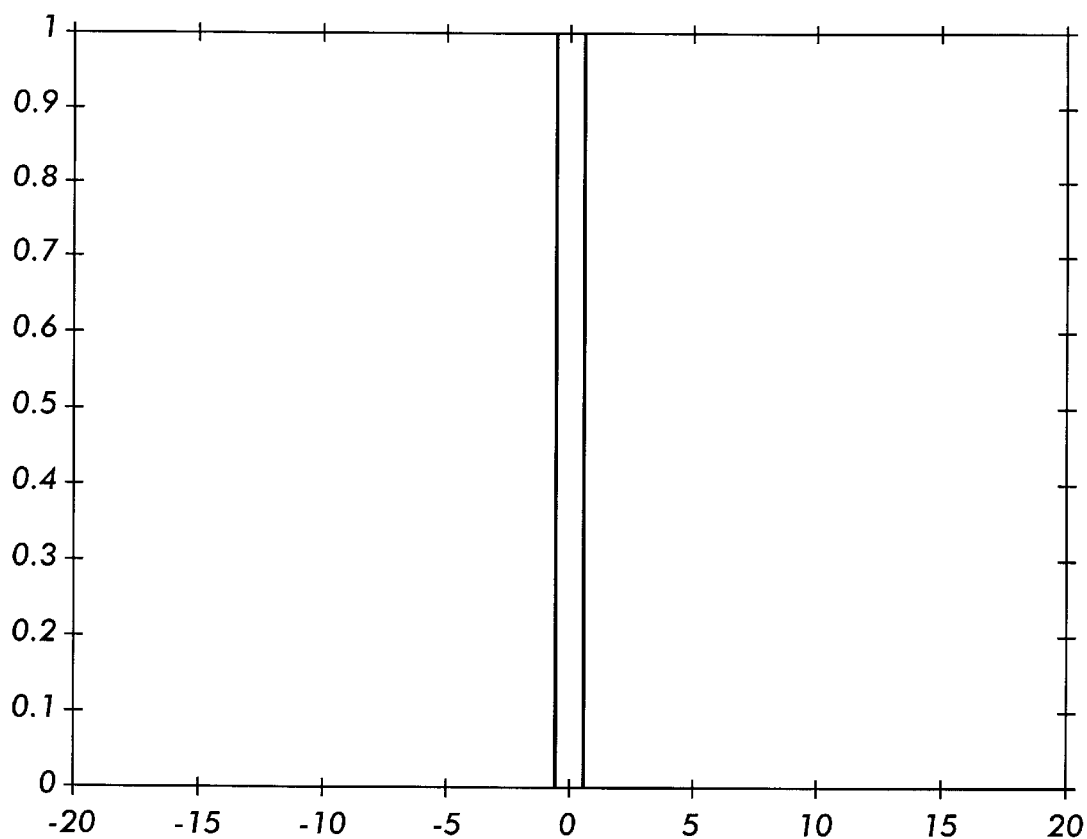
FIG. 5 is graph of a focal plane array pixel.

In view of the foregoing discussion, an explanation of the features illustrated in the drawings follows. FIG. 2 is a representation of point-like object over the horizon. FIG. 3 is a graph of a focal plane array lens point spread function. FIG. 4 is a graph of radar-generated size information rect(x) which is equivalent to the convolution of sinc(k) in the frequency domain. FIG. 5 is graph of a focal point array pixel having a size rect(k).

Figure 6:
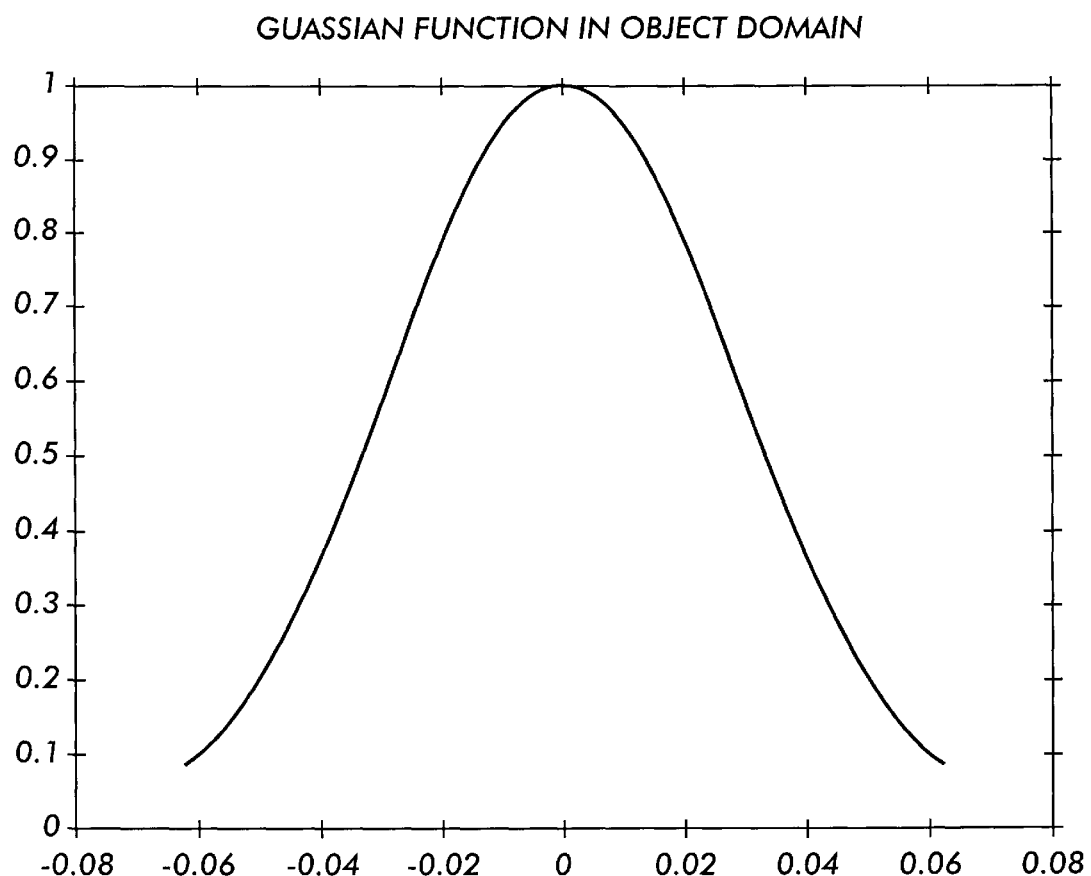
FIG. 6 is a graph of a Gaussian window function associated with the Morlet/Gabor Wavelet transform of the invention.
Figure 7:
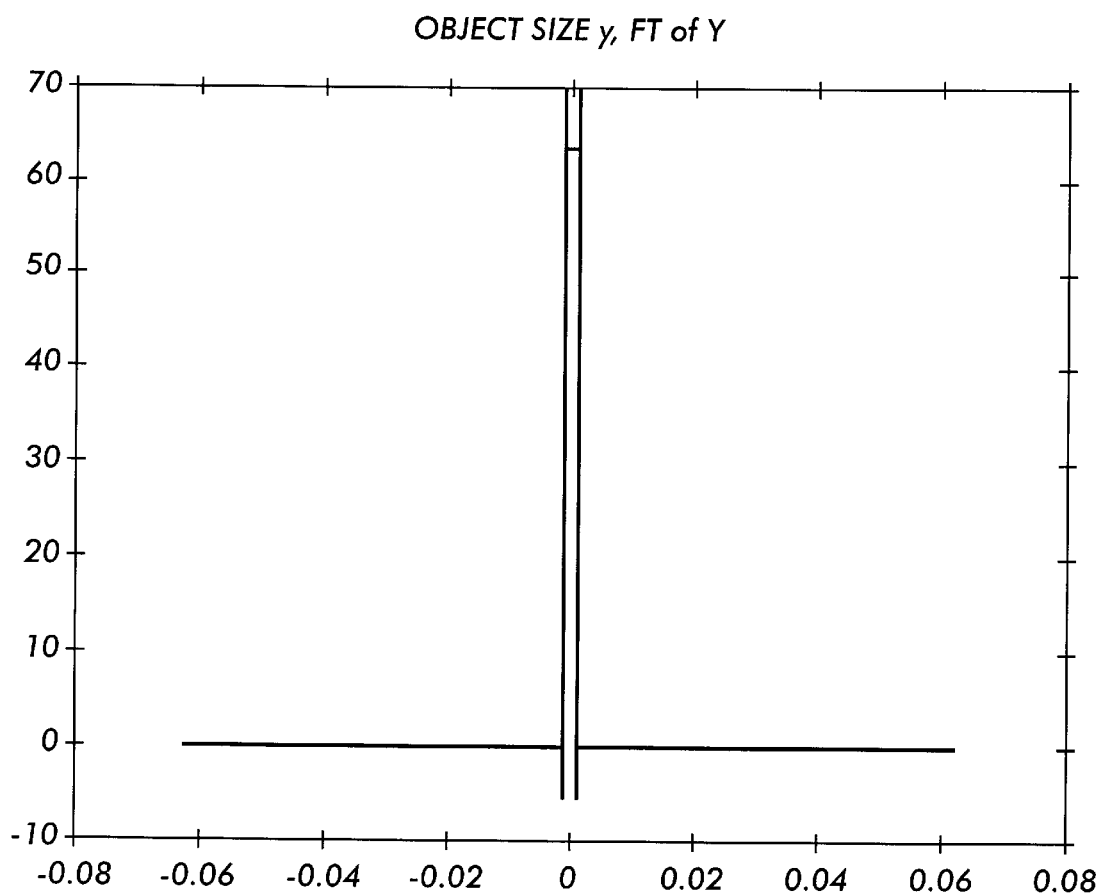
FIG. 7 is a graph of a radar size measurement.
Figure 8:
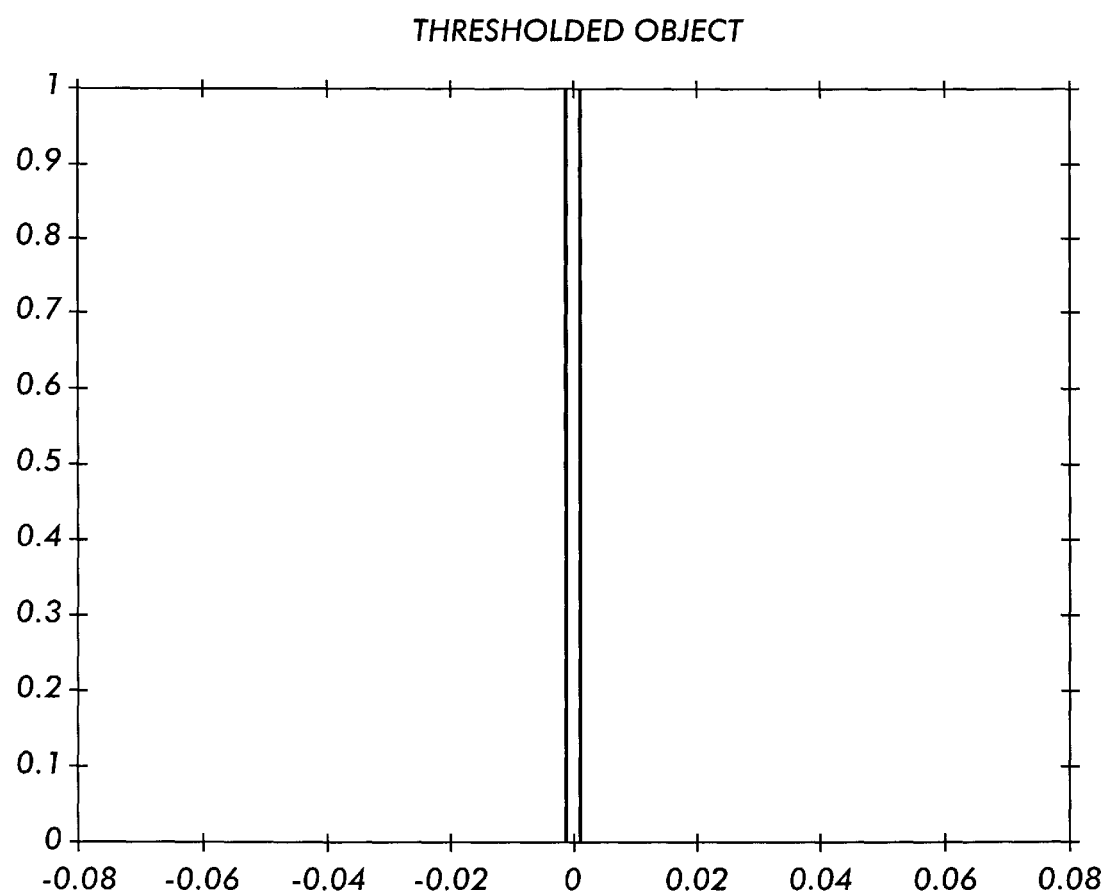
FIG. 8 is a graph showing pixel size rect(k) multiplied by Y(k)
Figure 9:
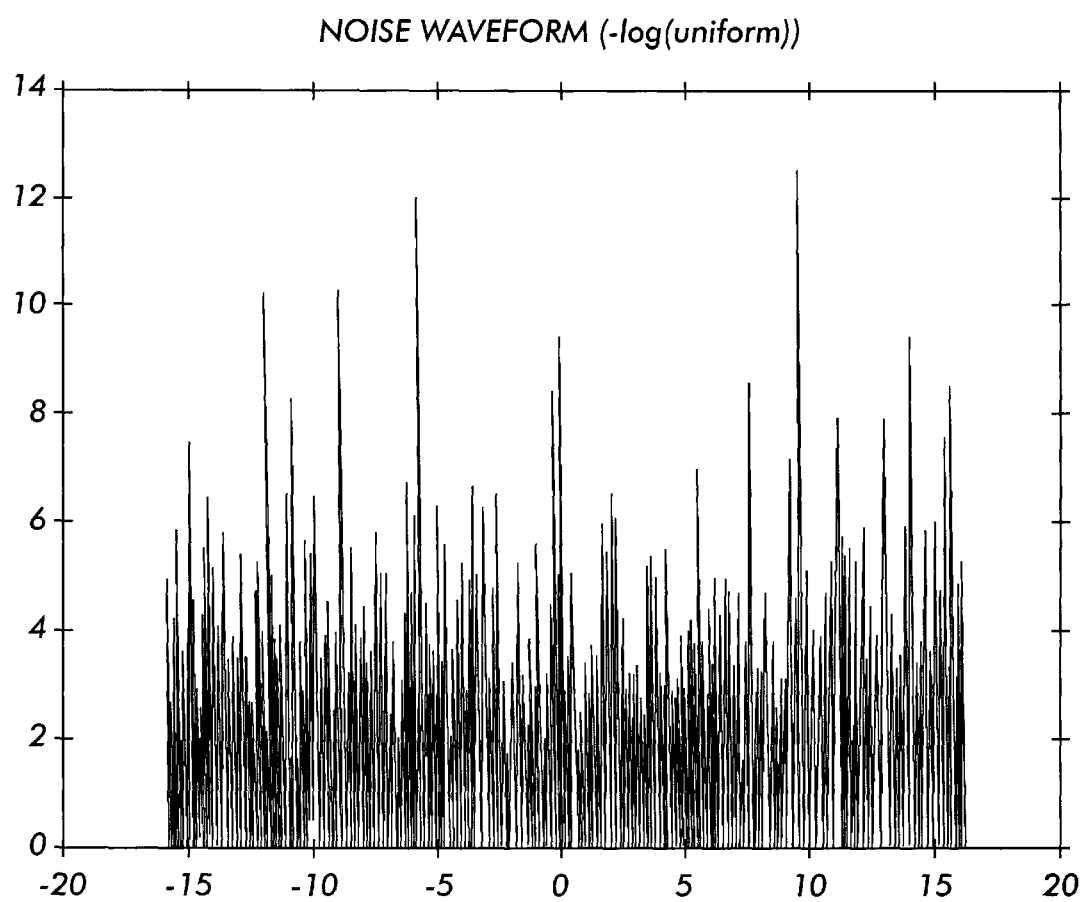
FIG. 9 is a graph showing the infrared noise spectrum of log (uniform) distribution.
Figure 10:
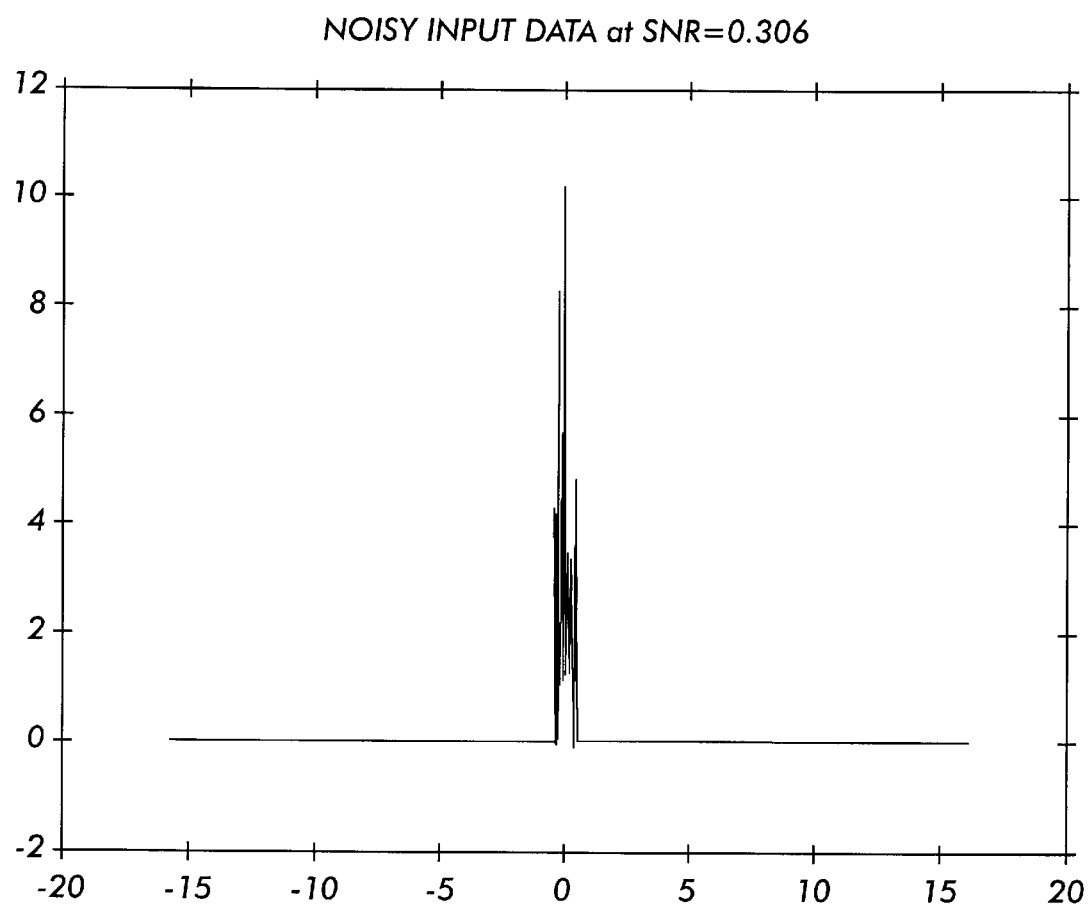
FIG. 10 is a graph of a noisy point.

FIG. 6 is a graph of a Gaussian window function associated with the Marlet/Gabor Wavelet transform of the invention. FIG. 7 is a graph of a radar size measurement where y=rect(x) which is equivalent to the Fourier transform Y(k)=sinc(k). FIG. 8 is a graph showing pixel size rect(k) multiplied by Y(k) which gives the threshold object at the focal point array. FIG. 9 is a graph showing the infrared noise spectrum of log (uniform) distribution. FIG. 10 is a graph of a noisy point having a signal-to-noise ratio of 0.306.

Figure 11:
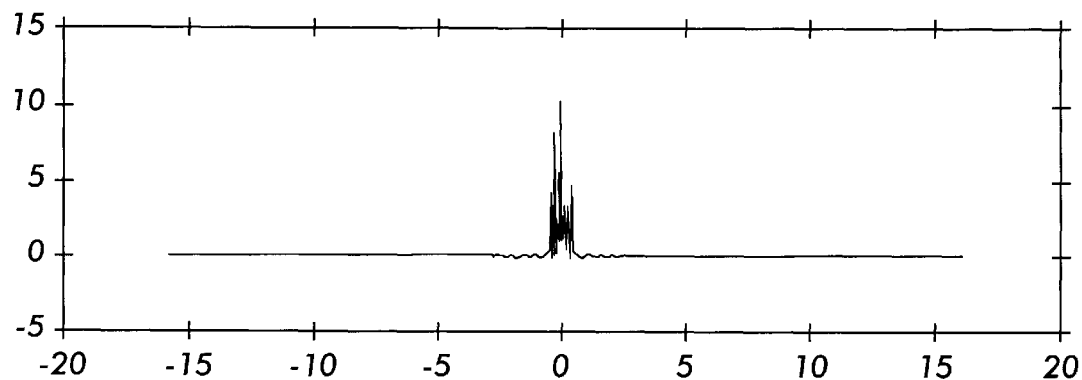
FIG. 11 is a graph of the size information radar measurement.
Figure 11:
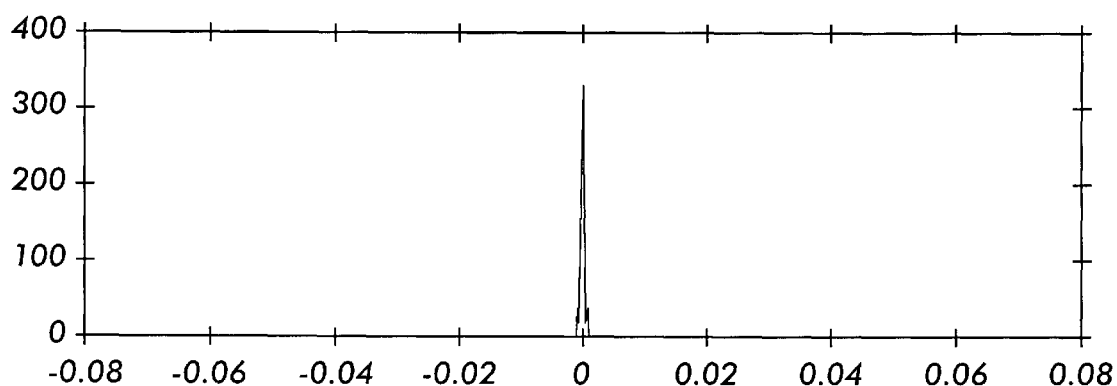

FIG. 11 is a graph of the size information radar measurement which is used to extrapolate a single-pixel sensor spectrum Y with the inventive Wavelet transform/Gabor transform (WT/GT) algorithm, after the tenth iteration, where the inverse transform gives the estimated triangle slope object y(x)=triangle (x).

Figure 12:
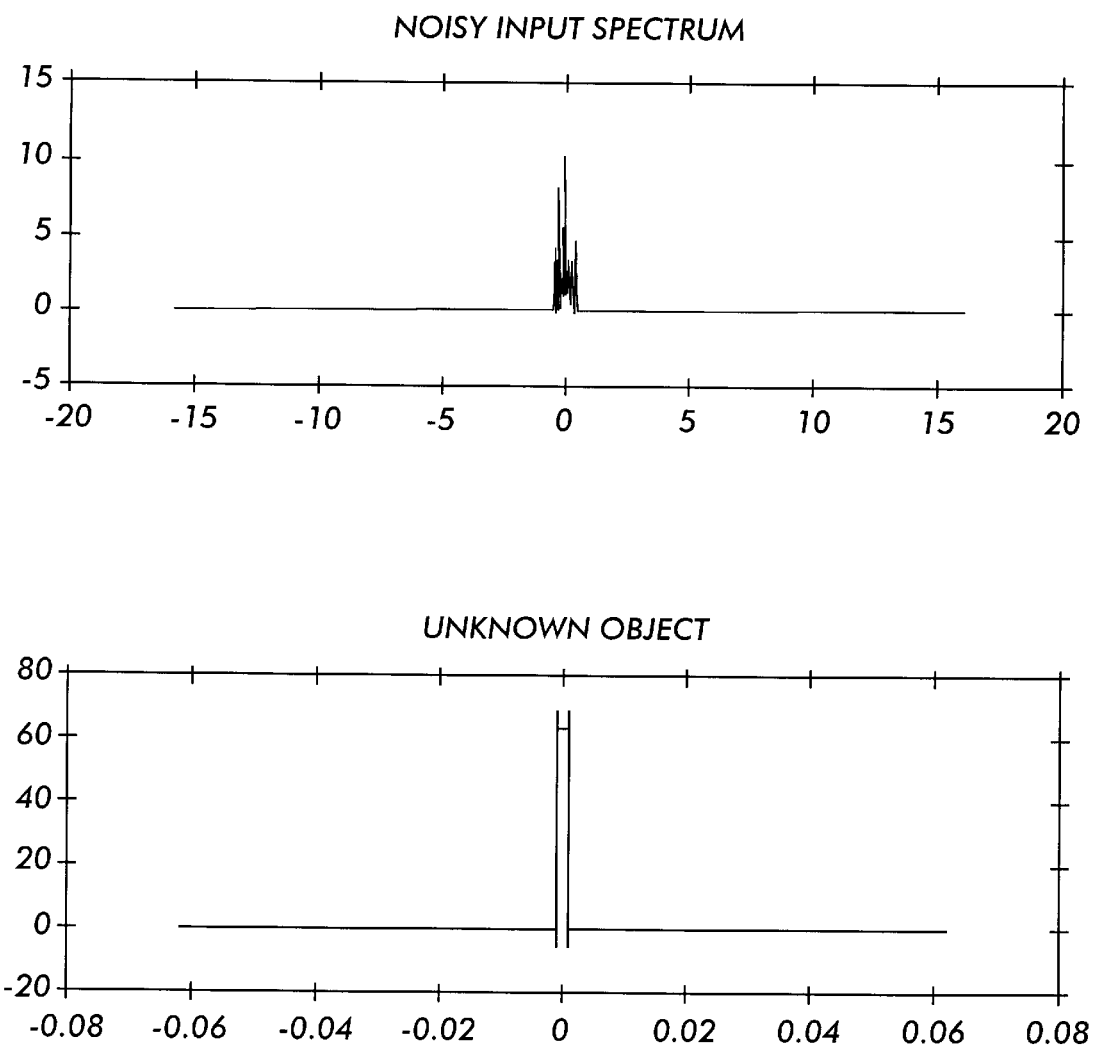
FIG. 12 is a graph showing the initial input spectrum and size of an object before application of the inventive WT/GT algorithm.
Figure 13:
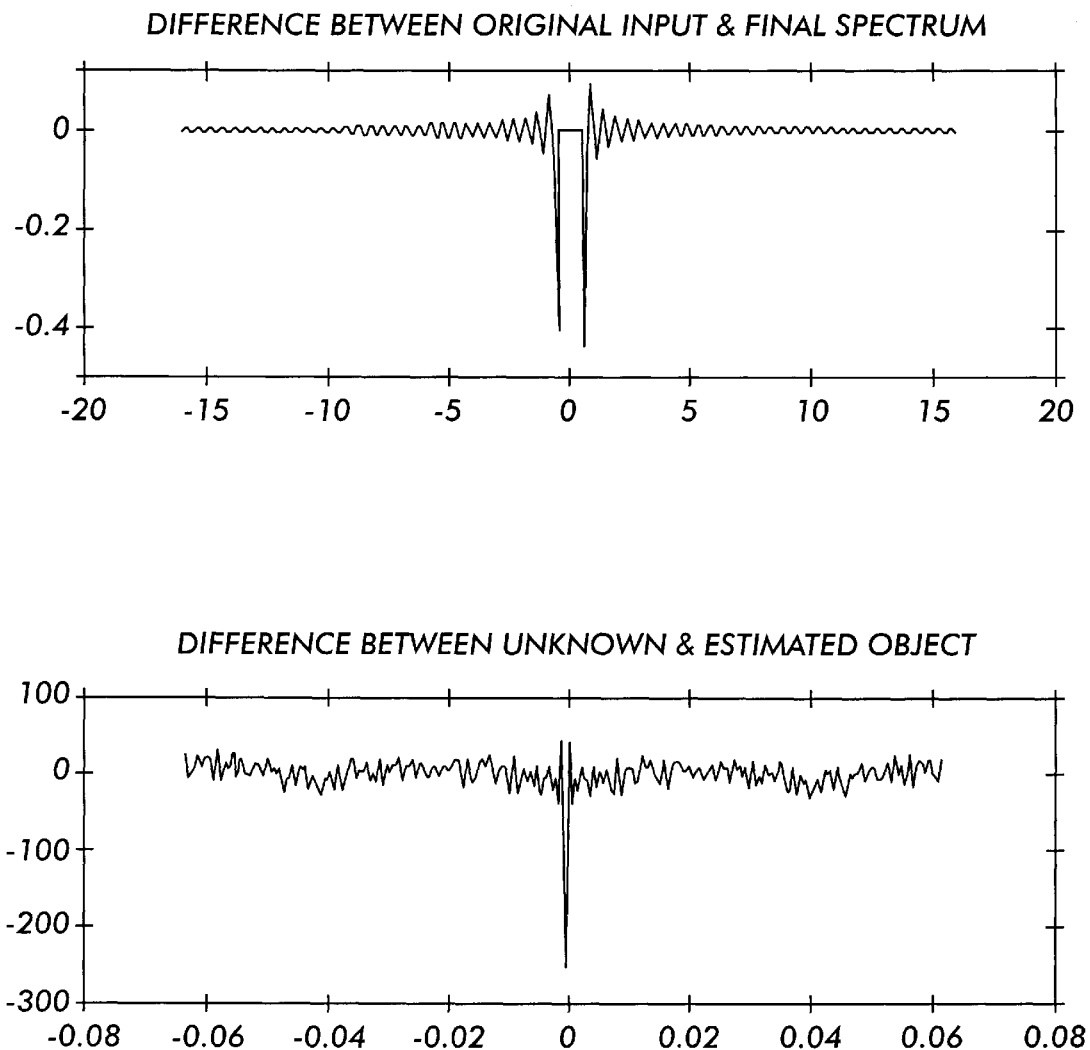
FIG. 13 is a graph showing the difference spectrum between the original input (e.g., FIG. 12) and the final estimated spectrum using the invention to determine object size information.
Figure 14:
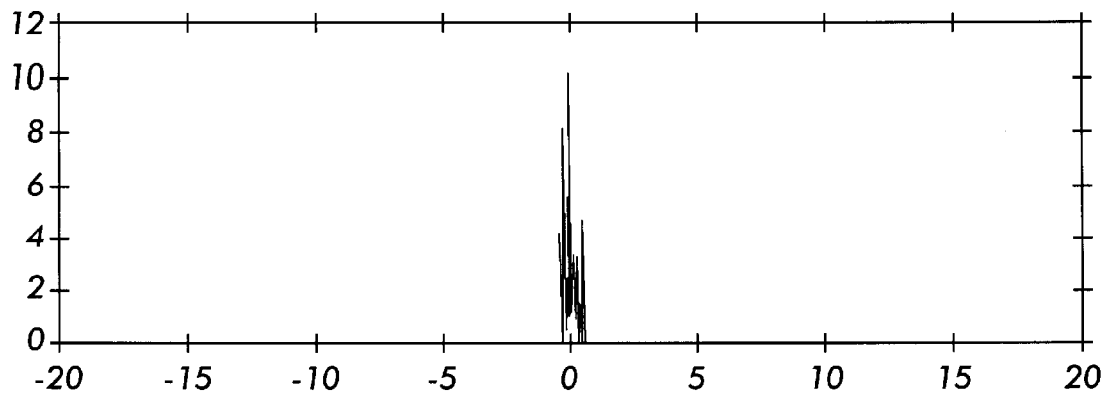
FIG. 14 is a graph showing the direct threshold spectrum above the noise floor.
Figure 14:
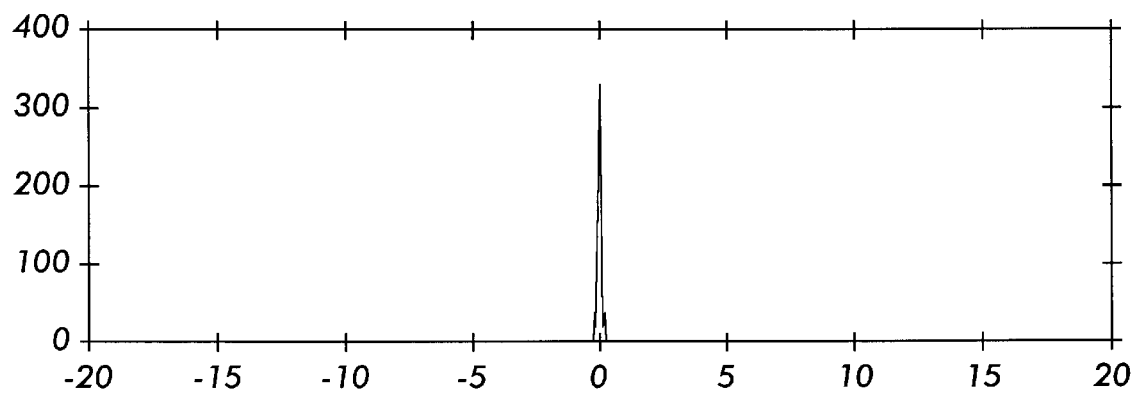
Figure 15:
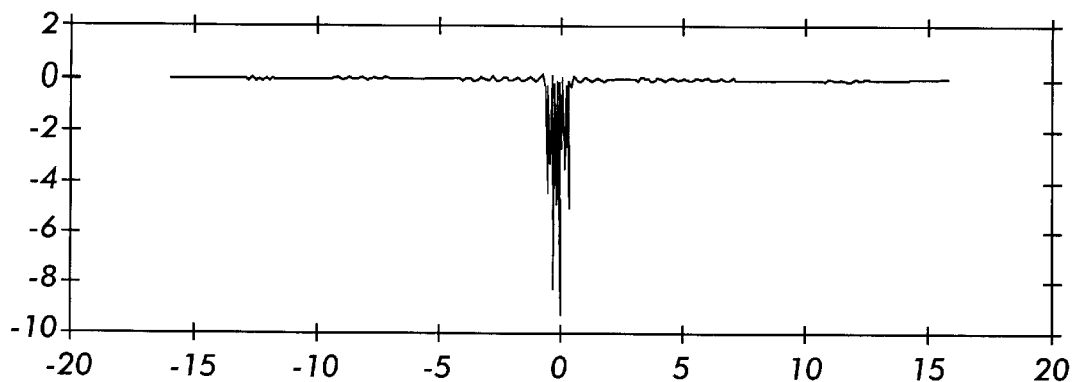
FIG. 15 is a graph showing the difference between a noise-free input and the a priori-known threshold spectrum and the object.
Figure 15:
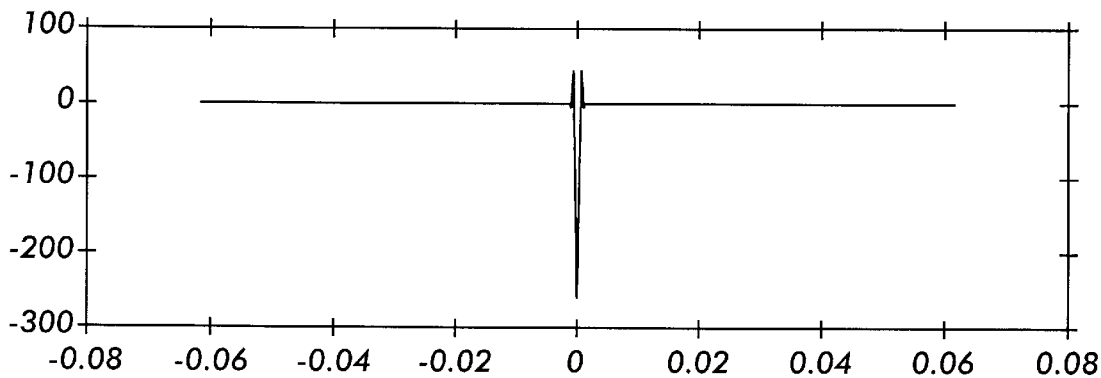

FIG. 12 is a graph showing the initial input spectrum and size of an object before application of the inventive WT/GT algorithm. FIG. 13 is a graph showing the difference spectrum between the original input (e.g., FIG. 12) and the final estimated spectrum using the invention to determine object size information. FIG. 14 is a graph showing the direct threshold spectrum above the noise floor of N=0.2815 and object size, ascertained using the inventive WT/GT algorithm in real world applications. FIG. 15 is a graph showing the difference between a noise-free input and the a priori-known threshold spectrum and the object.

FIG. 16 illustrates the convergence of noisy Superresolution in the spatial frequency domain. The pixel bandwidth of the focal point array represented by Rect (k) is shown on one axis and I−Rect (k) is shown on the opposing axis. The wavelength window G (k) limits the noise power N(k) of the infrared signal. The non-sensing area of the pixel Rect (k) eliminates the original signal F (k) of the missile plume discussed with respect to Equation 4, above. The percentage combination of the revised initial condition, discussed with respect to Equation 8 above, gives a better and smoother extrapolation, as is shown in FIG. 14.

Therefore, the invention increases resolution by combining the size characteristics from the radar signal with the interior characteristics of the infrared signal. The invention transforms the signals to the wavelet domain and then combines the signals (and/or extrapolates the signals) to increase long distance infrared resolution. The combined signal is then inverse transformed from the wavelet domain back to the image domain so that it can be displayed on conventional display devices.

With the invention, the infrared and radar size characteristics of distant objects can be combined and displayed with a much higher resolution, when compared to conventional structures.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for generating and displaying an image of a target object, including the steps of:

receiving an infrared signal from an infrared sensor that is positioned to detect the target object;

receiving a radar signal from a radar sensor that is positioned to detect the target object;

processing the infrared signal to extract information concerning an interior portion of the target object, and generating a processed infrared signal representative of this extracted information;

processing the radar signal to extract information concerning the size and shape of the target object, and generating a processed radar signal representative of this extracted information;

generating a first wavelet transform by transforming the processed infrared signal into a wavelet domain;

generating a second wavelet transform by transforming the processed radar signal into the wavelet domain;

combining the first and second wavelet transforms to produce a combined wavelet signal;

inverse transforming the combined wavelet signal to produce an image; and, displaying the image.

2. The method as set forth in claim 1, wherein the step of processing the infrared signal includes a sub-step of band-limiting the infrared signal.

3. The method as set forth in claim 1, wherein the step of processing the infrared signal includes a sub-step of extrapolating the infrared signal based on the radar signal.

4. The method as set forth in claim 2, wherein the step of processing the infrared signal includes a sub-step of extrapolating the infrared signal based on the radar signal.

5. The method as set forth in claim 1, wherein:

the infrared sensor includes a matrix of pixels, each of the pixels including a sensing area and a non-sensing area surrounding the sensing area; and, the step of processing the infrared signal includes a sub-step of extrapolating the infrared signal from the sensing area towards the non-sensing area based on the radar signal.

6. The method as set forth in claim 1, wherein:

the infrared sensor includes a matrix of pixels, each of the pixels including a sensing area and a non-sensing area surrounding the sensing area; and, the step of processing the infrared signal includes a sub-step of extrapolating the infrared signal from the sensing area towards the non-sensing area using target size and shape information extracted from the radar signal.

7. The method as set forth in claim 5, wherein the step of processing the infrared signal further includes a sub-step of band-limiting the infrared signal.

8. The method as set forth in claim 6, wherein the step of processing the infrared signal further includes a sub-step of band-limiting the infrared signal.

9. A system for generating and displaying an image of a target object, including:

an infrared sensor that is positioned to detect the target object and to generate an infrared signal that constitutes an infrared image of the target object;

a radar sensor that is positioned to detect the target object and to generate a radar signal that constitutes a radar image of the target object;

a processor that: processes the infrared signal to extract information concerning an interior portion of the target object; that generates a processed infrared signal representative of this extracted information; that processes the radar signal to extract information concerning the size and shape of the target object; that generates a processed radar signal representative of this extracted information; that generates a first wavelet transform by transforming the processed infrared signal into a wavelet domain; that generates a second wavelet transform by transforming the processed radar signal into the wavelet domain; that combines the first and second wavelet transforms to produce a combined wavelet signal; and, that inverse transforms the combined wavelet signal to produce a display domain signal; and, a display device that displays the image in response to the display domain signal.

10. The system as set forth in claim 9, wherein the processor band-limits the infrared signal during the processing of the infrared signal.

11. The system as set forth in claim 9, wherein the processor extrapolates the infrared signal based on the radar signal during the processing of the infrared signal.

12. The system as set forth in claim 10, wherein the processor extrapolates the infrared signal based on the radar signal during the processing of the infrared signal.

13. The system as set forth in claim 9, wherein:

the infrared sensor includes a matrix of pixels, each of the pixels including a sensing area and a non-sensing area surrounding the sensing area; and, the processor extrapolates the infrared signal based on the radar signal from the sensing area towards the non-sensing area based on the radar signal, during the processing of the infrared signal.

14. The system as set forth in claim 9, wherein:

the infrared sensor includes a matrix of pixels, each of the pixels including a sensing area and a non-sensing area surrounding the sensing area; and, the processor extrapolates the infrared signal from the sensing area towards the non-sensing area using target size and shape information extracted from the radar signal, during the processing of the infrared signal.

15. The system as set forth in claim 13, wherein the processor band-limits the infrared signal during the processing of the infrared signal.

16. The system as set forth in claim 14, wherein the processor band-limits the infrared signal during the processing of the infrared signal.

17. A system for generating and displaying an image of a target object, including:

means for receiving an infrared signal from an infrared sensor that is positioned to detect the target object;

means for receiving a radar signal from a radar sensor that is positioned to detect the target object;

means for processing the infrared signal to extract information concerning an interior portion of the target object, and generating a processed infrared signal representative of this extracted information;

means for processing the radar signal to extract information concerning the size and shape of the target object, and generating a processed radar signal representative of this extracted information;

means for generating a first wavelet transform by transforming the processed infrared signal into a wavelet domain;

means for generating a second wavelet transform by transforming the processed radar signal into the wavelet domain;

means for combining the first and second wavelet transforms to produce a combined wavelet signal;

means for inverse transforming the combined wavelet signal to produce an image; and, means for displaying the image.

\* \* \* \* \*